Patented Dec. 27, 1938

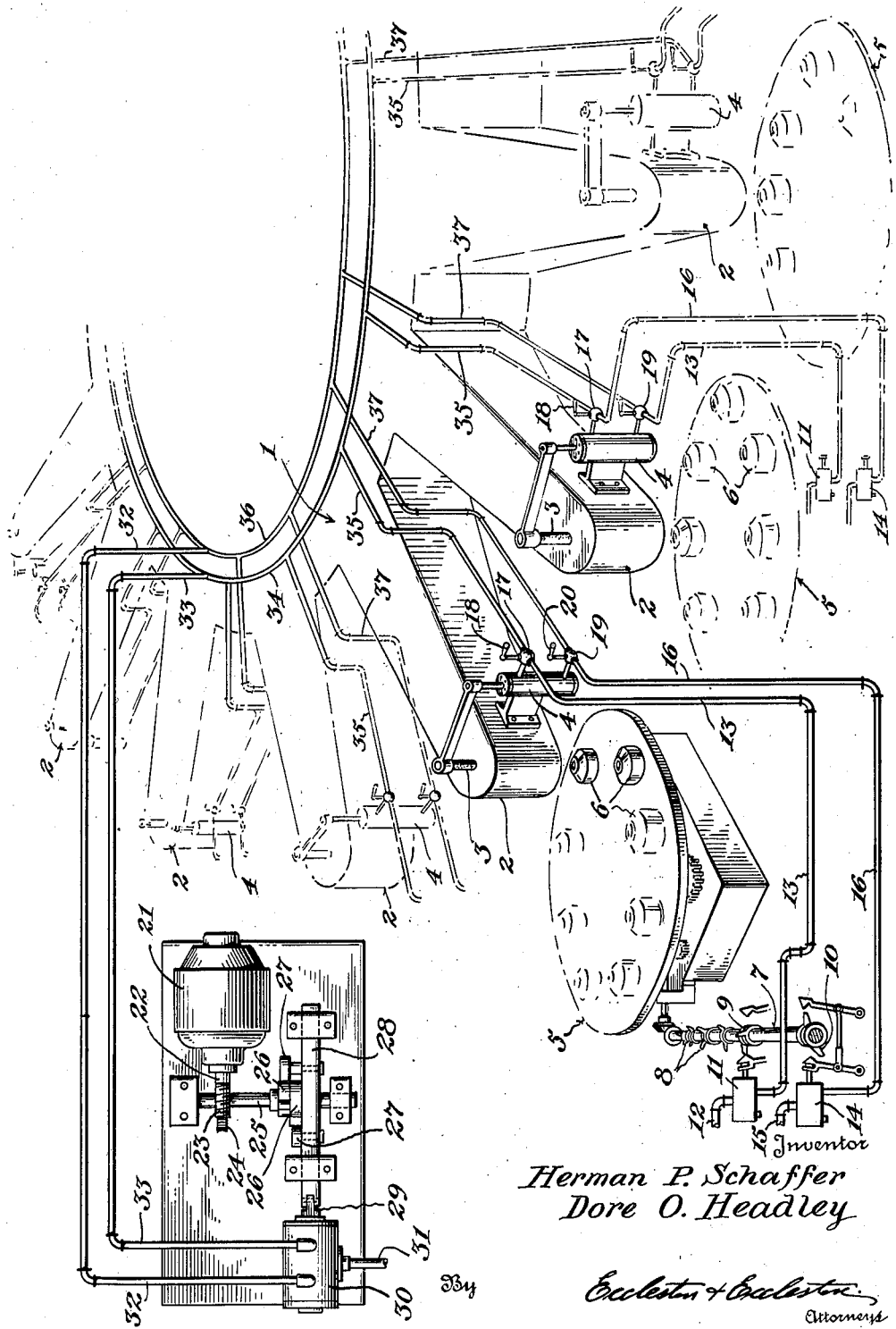

2,142,006

UNITED STATES PATENT OFFICE 2,142,006

TIMING SYSTEM FOR GLASS FEEDERS

Herman P. Schaffer and Dore O. Headley, Washington, Pa., assignors to Hazel-Atlas Glass Co., Wheeling, W. Va., a corporation of West Virginia Application December 15, 1936; Serial No. 116,020

3 Claims. (Cl. 49—5)

In the manufacture of glassware by machinery, a glass feeder is usually employed to deliver the glass charges to the molds of a forming machine. Frequently it is necessary to shut down the forming machine for various reasons, as when minor repairs have to be made, or other molds substituted, etc.

When the forming machine is shut down and the feeder stopped, the condition and temperature of the glass in the flow spout quickly changes, and when the forming machine and feeder are started up again it is often necessary to run the feeder for quite long periods before the condition and temperature of the glass are proper for the manufacture of glassware. On the other hand, if the feeder is continued in operation while the forming machine is shut down, the condition and temperature of the glass in the flow spout do not change, and the manufacture of glassware may be resumed just as soon as the forming machine is thrown into operation.

Accordingly, one of the objects of the present invention is to provide new and improved means by which a feeder may be kept in operation when its forming machine is shut down.

Another object of the invention is to provide means of this character which require only the shifting of valves to retain the feeder in operation when its forming machine is shut down.

A further object of the invention is to provide a master timing system in connection with a battery of feeders, and means whereby any one, or all, of the battery of feeders may be operatively connected with the master timing system, when any one or all of the forming machines and their individual timers are shut down.

Various other objects and advantages of the invention will be aparent to those skilled in the art, from the following detailed description, when taken in connection with the accompanying drawing; in which, The figure is a view of the complete system; parts being shown in plan, and parts being illustrated more or less diagrammatically.

Referring to the drawing in more detail, numeral 1 indicates a conventional continuous glass melting tank, from which extend any desired number of conventional flow spouts 2. Each of these flow spouts is equipped with a glass feeder, including a feeder plug 3 reciprocable in the flow spout over a flow orifice (not shown), and a cylinder 4 for reciprocating the plug in proper timed relation with a glass forming machine.

Arranged under each flow orifice is a forming machine 5 carrying the desired number of molds 6. Of course any suitable type of forming machine may be used, such as one-table machines, two-table machine, presses, press and blow machines, etc. Associated with each forming machine is a cam shaft 7, driven from the forming machine and carrying a number of cams 8, for operating the various parts of the forming machine in proper timed relation.

This shaft 7 also carries two set of cams 9 and 10, for operating the feeder. Numeral 11 refers to a conventional valve which receives air under pressure, from any desired source, through pipe 12. When the valve stem of this valve is moved in one direction, by one of the cams 9, compressed air is admitted to pipe 13, through which it passes to the upper end of cylinder 4 to move the feed plug 3 downward. And when the valve stem is moved in the opposite direction by the other cam 9 the air is exhausted through this same pipe 13, in the well known manner. Numeral 14 refers to a similar valve receiving compressed air through pipe 15. When the valve stem of this valve is moved in one direction by one of the cams 10 compressed air is admitted to a pipe 16, through which it passes to the lower end of cylinder 4 to move the feed plug upward. And when the valve is moved in the opposite direction the air is exhausted through the same pipe 16. Thus the continued rotation of the cam shaft 7 causes the forming machine to perform its various operations proper timed relation, and also controls the operation of the cylinder 4 to cause the feeder plug to reciprocate to form the mold charges in timed relation with the forming machine. All of this is conventional and well known in the glass industry. It is to be noted, however, that in accordance with the present invention a three-way valve 17, operated by a valve handle 18, is incorporated in the air line 13 leading to the upper end of cylinder 4, and a similar valve 19, operated by a valve handle 20, is incorporated in the air line 16 leading to the lower end of cylinder 4. The purpose of these two three-way valves 17 and 19 will appear hereinafter.

The master timing system for controlling the operation of any one or all of the feeders, when one or more of the forming machines are shut down, will now be described. Numeral 21 refers to a motor having a shaft 22, provided with a worm 23. This worm drives a worm wheel 24, mounted on a shaft 25, carrying a pair of cams 26. These cams alternately engage cam rollers 27 carried by a rod 28, and the rod is thereby moved back and forth at the proper instant.

The rod 28 moves the valve stem 29 of a double valve 30. Air under pressure is continuously admitted to the valve casing through a pipe 31, leading from any desired source of compressed air. Two pipes, referred to by numerals 32 and 33, lead from this valve. When the valve stem 29 is moved in one direction air will be admitted to the pipe 32, and air will be exhausted from the pipe 33. And when the valve stem is moved in the opposite direction air will be admitted to pipe 33 and air will be exhausted from pipe 32. Valves of this type are well known, and no detailed description of the valve is necessary.

The pipe 33 leads to a pipe 34 which extends along the entire battery of flow spouts 2, and at each flow spout a branch pipe 35 leads therefrom to the three-way valve 17 at the upper end of the feeder-operating cylinder 4.

The pipe 32 leads to a pipe 36 which also extends along the entire battery of flow spouts, and at each flow spout a branch pipe 37 leads therefrom to the three-way valve 19 at the lower end of the feeder-operating cylinder.

The motor 21 is operated continuously and the valve 30 causes air to be alternately admitted to and exhausted from each of the pipes 34 and 36 and the various branch pipes leading therefrom to the three-way valves at the top and bottom of the cylinders which form part of each feeder of the battery of feeders. There is thus available for instant use, and for each and all of the feeder cylinders, a timing system separate from the timing mechanism employed with each forming machine.

The operation of the invention will now be briefly described. In normal operation, the cam shaft 7 associated with each forming machine causes the various operations of the forming machine to be performed in timed relation, and also by operating the valves 11 and 14 causes air to be alternately admitted to opposite ends of the cylinder 4 of the feeder associated with the forming machine, thereby reciprocating the feeder plug 3, in the well known manner.

When the forming machine is stopped of course, the cam shaft 7 is stopped, thereby stopping the operation of the feeder. As mentioned above, when a feeder is stopped there is a change in the temperature and condition of the glass in the flow spout. In accordance with the present invention, immediately upon stopping a forming machine, the three-way valves 17 and 19 are shifted to shut off communication between the pipes 13 and 16 and the cylinder 4 associated with the feeder of the forming machine which has been stopped, and opening communication between the pipes 35 and 37 and the cylinder 4. Thus the feeder continues in operation as before, but is now under the control of the master timer.

It may be mentioned that when the feeder is being controlled by the master timer its operation need not have exactly the same timing as when under the control of its individual cam shaft, but when the forming machine is again started of course the feeder will have the exact timing it had previously, for it will then be under the control of its individual cam shaft. When the forming machine is started up the three-way valves 17 and 19 are shifted to their original position, thereby cutting off communication between the cylinder and the pipes 35 and 37, and opening up communication between the cylinder and the pipes 13 and 16. Any one of the forming machines of the battery may be shut down, and any number of them may be shut down at the same time, and the feeders will continue to operate by merely shifting the valves.

Having fully described the invention what we claim is:

1. A timing system for continuously operating glass feeders, including a forming machine, a cylinder-operated feeder associated with the forming machine, a timing cam shaft associated with the forming machine, valves operated by the cam shaft, air lines leading from the valves to the top and bottom of the feeder cylinder, other air lines leading to the top and bottom of the feeder cylinder, means for periodically admitting air pressure to the last-mentioned air lines to continue the feed when the forming operation is discontinued, and valves to throw either set of air lines into communication with the feeder cylinder.

2. A timing system for continuously operating glass feeders, including a forming machine, a cylinder-operated feeder associated with the forming machine, a timing cam shaft associated with the forming machine, valves operated by the cam shaft, air lines leading from the valves to the top and bottom of the feeder cylinder, other air lines leading to the top and bottom of the feeder cylinder, a timing cam shaft controlling the admission of air pressure to the last-mentioned air lines to continue the feed when the forming operation is discontinued, and three-way valves for throwing either set of air lines into communication with the feeder cylinder.

3. A timing system for continuously operating glass feeders, including a plurality of forming machines, a cylinder-operated feeder associated with each forming machine, a timing cam shaft associated with each forming machine, valves associated with each forming machine and operated by the cam shafts of the forming machines, air lines leading from the valve to the top and bottom of each feeder cylinder, a master timer to continue the feed when the forming operation is discontinued, other air lines leading from the top and bottom of all of the feeder cylinders to the master timer, and valves to open communication between any cylinder and the air lines leading to the timing shaft of the forming machine associated with such feeder or the air lines leading to the master timer.

HERMAN P. SCHAFFER.
DORE O. HEADLEY.